United States Patent
Stern et al.

(10) Patent No.: US 7,162,625 B2
(45) Date of Patent: Jan. 9, 2007

(54) SYSTEM AND METHOD FOR TESTING MEMORY DURING BOOT OPERATION IDLE PERIODS

(75) Inventors: Jonathan T. Stern, Round Rock, TX (US); Marc D. Alexander, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 855 days.

(21) Appl. No.: 10/385,135

(22) Filed: Mar. 10, 2003

(65) Prior Publication Data

US 2004/0181656 A1    Sep. 16, 2004

(51) Int. Cl.
*G06F 13/28* (2006.01)
*G11C 29/00* (2006.01)

(52) U.S. Cl. .................. 713/2; 711/141; 711/142; 711/143; 711/145; 714/14; 714/36; 714/718

(58) Field of Classification Search .............. 713/2; 711/141–145; 714/14, 36, 718
See application file for complete search history.

(56) References Cited

U.S. PATENT DOCUMENTS

| 5,325,365 | A |   | 6/1994 | Moore et al. ............ 371/16.2 |
| 5,659,748 | A |   | 8/1997 | Kennedy .................. 395/652 |
| 5,860,001 | A |   | 1/1999 | Cromer et al. ............ 395/651 |
| 6,092,135 | A | * | 7/2000 | Kwon ....................... 710/104 |
| 6,158,000 | A |   | 12/2000 | Collins ........................ 713/1 |
| 6,216,226 | B1 |   | 4/2001 | Agha et al. ................... 713/2 |
| 6,374,353 | B1 | * | 4/2002 | Settsu et al. .................. 713/2 |
| 6,434,696 | B1 | * | 8/2002 | Kang ........................... 713/2 |
| 6,883,091 | B1 | * | 4/2005 | Morrison et al. ............ 713/2 |
| 6,920,533 | B1 | * | 7/2005 | Coulson et al. ............ 711/145 |
| 6,937,519 | B1 | * | 8/2005 | Chevallier et al. ..... 365/185.18 |
| 6,938,127 | B1 | * | 8/2005 | Fletcher et al. ............ 711/141 |

\* cited by examiner

*Primary Examiner*—A. Elamin
(74) *Attorney, Agent, or Firm*—Baker Botts L.L.P.

(57) ABSTRACT

The present invention discloses an information handling system that reduces POST time in a boot operation. The information handling system includes a processor, a memory and a BIOS unit. The BIOS also includes memory test pointer and a test block size indicator. During the POST routine, the BIOS tests at least one test block during at least one idle period.

20 Claims, 2 Drawing Sheets

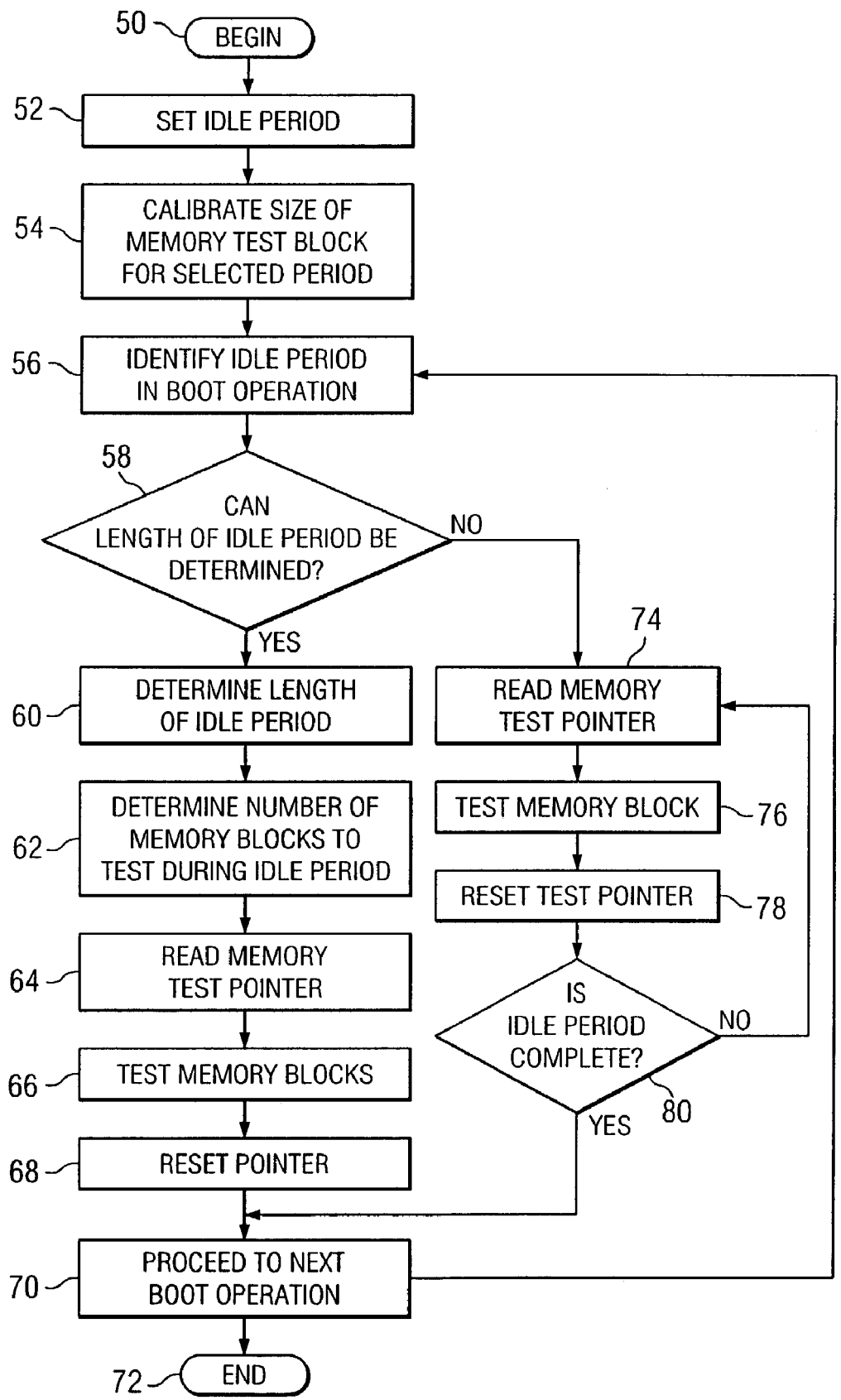

SYSTEM AND METHOD FOR TESTING MEMORY DURING BOOT OPERATION IDLE PERIODS

TECHNICAL FIELD

This invention relates in general to the field of information systems. More particularly, this invention relates to a system for testing memory during idle periods that occur during a boot operation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Memory is a key feature of an information handling system. As time and technology progress, information handling system memory continues to increase in size. More memory allows a user to run larger programs and store larger pieces of information.

During the initialization of the information handling system, a basic input/output system (BIOS) executes a power-on self-test (POST) routine that tests the memory's stability and integrity. After the POST routine is completed, the operating system is loaded and the system is ready for use.

The amount of time it takes to test the memory in an information handling system is typically a linear function based on the size of the memory to test. As the amount of system memory increases, the amount of time for memory testing increases proportionally.

Memory testing with conventional methods has the disadvantage of taking too much time. As the amount of memory increases, the delay before an operating system loads increases. This delay may push the total POST time beyond acceptable time limits because users desire quick boot times and find long boot times inconvenient. In addition, slow boot times reflect negatively on the information handling system as a whole. Also, software developers desire minimal boot times and provide incentives for information handling system manufacturers that have favorable boot times.

SUMMARY

Therefore, a need has arisen for a system and method which decreases the time to complete a power-on self-test (POST) routine in an information handling system.

A further need exists for a system and method for testing memory more efficiently.

In accordance with the teachings of the present disclosure, a system and method for reducing the amount of time to execute a POST routine is provided that substantially reduces disadvantages and problems associated with previously developed memory testing systems and methods by utilizing idle periods during boot operations to test system memory.

In one aspect an information handling system is disclosed that includes a processor, a Random Access Memory and a Basic Input/Output System (BIOS). The BIOS includes a memory test pointer and a test block size indicator. The BIOS performs a Power On Self Test (POST) routine and also tests one or more test blocks of the RAM during one or more idle periods during the POST routine. More particularly, the BIOS may test one or more memory test blocks during the spin up period of an associated hard drive.

In another aspect, a basic input output system (BIOS) is disclosed that includes a test pointer, a memory test block size indicator having a pre-selected period and a memory test block period indicator. The BIOS calibrates the test block size indicator for the pre-selected period prior to running a (POST) routine and the BIOS also tests one or more memory test blocks during idle periods that occur during the POST routine.

In another aspect, a method for reducing POST routine times includes providing a BIOS that includes a test pointer, a test block size indicator, and a test block period indicator. The method also includes calibrating the test block size indicator prior to running a POST routine and then testing one or more test blocks during one or more idle periods during the POST routine.

The present invention provides a number of important technical advantages. One technical advantage is providing a BIOS for testing memory test blocks during POST routine idle periods. By testing memory blocks during POST routine idle periods, the overall time for completing a post routine is reduced. The efficiency of testing POST routine memory is also enhanced by completing a portion of memory testing during period in which the system would otherwise not be active. Further advantages of the present disclosure are described in the description, FIGURES, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a flow diagram showing a method for testing memory blocks during idle periods of a boot operation according to teachings of the present disclosure.

DETAILED DESCRIPTION

Figure 1:
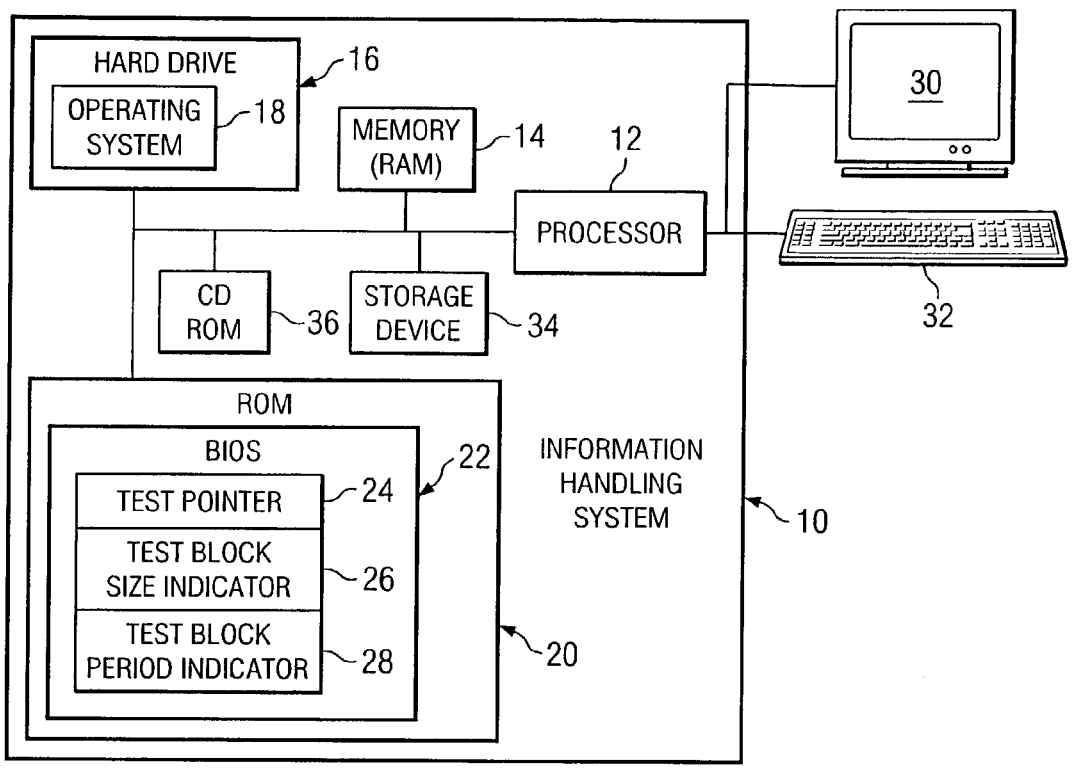
FIG. 1 is an illustration of an information handling system according to teachings of the present disclosure.
Figure 3:
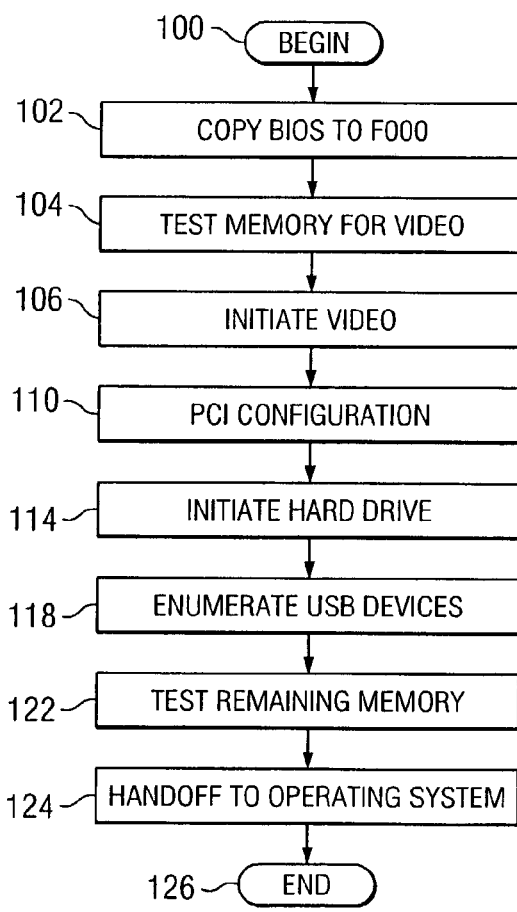
FIG. 3 is a flow diagram showing a boot operation according to teachings of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 depicts an information handling system, depicted generally at 10, according to teachings of the present disclosure. Information handling system 10 includes processor 12, memory 14 and Read Only Memory 20 in operable communication with processor 12. Information Handling System 10 also includes an associated hard drive 16 that includes operating system 18, monitor 30, keyboard 32, Storage Drive 34 and optical drive 36. In the present embodiment, optical drive 36 is a CD ROM drive. In alternate embodiments, optical drive 36 may be any suitable optical storage drive such as a DVD drive.

In the example embodiment, information handling system 10 may further include respective software components and hardware components, such as expansion cards, dip switches, jumper pins, capacitors, resistors, pin connectors as well as any other appropriate computer hardware. The various hardware and software components may also be referred to as processing resources.

Processor 12 may be a central processing unit (CPU) or a microprocessor. In the present embodiment, one processor 12 is shown, however, alternate embodiments may include multiple and/or parallel processors.

BIOS 22 is the basic input/output system in information handling system 10. BIOS 22 serves as an intermediate between the operating software 18 and hardware such as memory 14. In the present embodiment, BIOS 22 is permanently contained within read only memory (ROM) chip 20. The present embodiment includes only a single ROM chip 20, however alternative embodiments may include multiple ROM chips. When information handling system 10 is turned on, BIOS 22 runs a POST routine (as described below in FIG. 3). After the POST routine is complete, BIOS 22 hands off to operating system 18. During the POST routine, the BIOS 22 is preferably operable to perform testing on memory 14.

Memory 14 is a storage area of information handling system 10. Memory 14 may be physical memory, a chip that stores data. In a preferred embodiment memory 14 is random access memory (RAM). Memory 14 may be dynamic random access memory (DRAM), extended Data Out random access memory (EDO RAM), video random access memory (VRAM), Static random access memory (SRAM), synchronous DRAM (SDRAM), single in-line memory modules (SIMM), dual in-line memory modules (DIMM), error correcting code (ECC) or any other suitable data storage medium. Memory 14 may be a single chip or a plurality of chips.

BIOS 22 is further operable to test portions of memory 14 during idle periods (described in more detail, below) that occur during the operation of a POST routine. In one embodiment, BIOS 22 performs data testing and address testing on memory 14. BIOS 22 performs data testing on memory 14 by writing a random series of I/O data points on the memory. BIOS 22 reads back the data, comparing the data pattern written to the data pattern it read. If the data patterns are the same, then the memory functions correctly. If the data patterns are not the same, BIOS 22 determines that an error has occurred.

BIOS 22 performs address testing by sending a message to a particular memory address. BIOS 22 then reads the data from the location where data was sent. If the correct data pattern is found at the correct location, the memory's address is correct. If the correct data pattern is not found at this location, BIOS 22 determines that an error has occurred.

In the present preferred embodiment, BIOS 22 includes test pointer 24, test block size indicator 26, and test block period indicator 28. Test pointer 24 identifies the most recently tested memory. For example, at the initial stage of a boot operation, test pointer 24 will point to the first portion of memory 14 to be tested. During a first idle period, after a test block of 100 megabytes (MB) of RAM memory is tested, test pointer 24 will then indicate the starting point of the next portion of memory 14 to be tested (immediately following the portion of memory 14 just tested.) To accomplish this, test pointer 24 preferably communicates with BIOS 22. In operation, BIOS 22 tests the test block indicated by test pointer 24. BIOS 22 then communicates the address of the last portion of memory 14 tested to test pointer 24. Test pointer 24 then records this information.

Test block size indicator 26 stores the size of the block of memory that BIOS 22 can test during a selected time period. Before the POST routine begins (or during an initial stage of POST), BIOS 22 calibrates the size of the test block that may be tested during a pre-selected time period. BIOS 22 does this by determining the amount of memory it can test in a given time period. The test block size is the amount of memory information handling system 10 can test in a pre-set time interval. The test block size may vary depending on speed of processor 12, the software or hardware that make up information handling system 10, or other factors that may or may not change over time. An information handling system 10 with a faster processor 12 may test a larger amount of memory 14 during a given period. Once BIOS 22 calculates the test block size, BIOS 22 stores the result in test block size indicator 26. Accordingly, test block size indicator 26 shows the amount of memory 14 to be tested in each memory test block.

Test block period indicator 28 stores the amount of time selected to test portions of memory in idle periods of the POST routine. In a preferred embodiment, test block period indicator 28 is approximately 100 microseconds. In alternative embodiments, test block period indicator 28 may range from between approximately 50 to 250 microseconds. In one embodiment, BIOS 22 may adjust test block period indicator 28 to a new time value depending upon the components associated with information handling system 10. If a new component is added to information handling system 10, BIOS 22 may decrease the test block period. If a hardware component is removed, BIOS 22 may increase the time period of indicator 28.

BIOS 22 tests portions of memory 14 during idle periods that occur during the operation of a POST routine, as further described in FIG. 2, below.

FIG. 2 is a flow diagram showing a method for testing memory blocks during idle periods of a boot operation according to teachings of the present disclosure.

FIG. 2 begins at step 50, preferably the initiation of a boot operation. In one preferred embodiment, the idle period is pre-selected. In an alternative environment the method proceeds to step 52 where BIOS 22 sets the idle period. As described above, BIOS 22 may set the idle period based on different factors such as processor speed and known idle times for mechanical and electrical components.

At step 54, BIOS 22 calibrates the size of the memory test block for the selected time period as described above. In an alternative embodiment, the memory test block size may be a pre-selected block size (thus, not requiring calibration step 54.)

For the purpose of this disclosure an idle period is a time during a boot operation in which the BIOS is waiting for a communication, signal, or operation of another system component before proceeding to the next boot operation. During a boot operation, a significant amount of time is spent waiting for responses by other components of information handling system 10. When awakening mechanical or electrical components, idle periods occur. During some of those idle times, BIOS 22 is waiting for a pre-set response interval of time before sending another signal. In another example, BIOS 22 must wait for a mechanical feature to perform a particular physical task. For example, BIOS 22 must wait for a hard drive to rotate to a particular portion of the platter. Hardware devices often have relatively lengthy idle periods. An advantage of the present disclosure is that instead of having BIOS 22 remain idle while waiting for the idle period to end, BIOS 22 can utilize this idle period by testing portions of memory 14 until the idle period has ended. By testing those portions of memory 14 during each idle period, the amount of memory that must be tested during the normal memory testing portion of the POST routine is reduced. This consequently reduces total boot time for information handling system 10 while maintaining the integrity of the system. The integrity of the memory is maintained because the memory is tested using the same testing techniques (as discussed above).

In step 56, an idle period with a POST routine is identified. Many times an idle period is known beforehand. For example, during boot there are known waiting times for particular devices, components, or systems to respond. BIOS 22 wakes up a device and then determines if the device is ready in pre-set time intervals. During this waiting period or idle period, BIOS 22 may test one or more memory test blocks as described below.

In another situation, an idle period occurs because a BIOS communicates with a device to wait a certain period of time before the device propagates the command. For example, with each Peripheral Component Interconnect (PCI) card, at least a certain known time period lapses before the PCI card responds.

If the boot requires a mechanical function, there is often an idle period during the physical function. For example, it will take a period of time for the hard drive to rotate until it reaches sector zero on the platter.

In the present embodiment, idle periods are identified by a system designer and then are incorporated into the BIOS code. In an alternate embodiment, idle periods may be identified automatically by the BIOS or another component.

Upon the identification of a idle period occurring, it is next determined if the length of the idle period can be determined. For example, when awakening mechanical components, BIOS 22 will have to wait a pre-set period of time before the device responds.

Other times, the idle period will vary depending on various factors and will not be known. For a mechanical component or feature, the amount of time it will take that feature to perform its task will be unknown: for example the amount of time for hard drive 16 to "spin up" will be unknown. Another situation where the idle time is unknown is when awakening a device. In some instances, a device may respond back after the first signal from BIOS 22 that it is ready, however in other instances it may take multiple signals until the device responds that it is ready.

If the length of the idle period can be determined, the method proceeds to step 60, where the actual length of time of the idle period is determined. In some instances, this time period may be contained in the code that requires it to wait that period of time in operation.

In step 62, the number of memory blocks to test during the idle period is determined. With the amount of time of the idle period known, it is then divided by the value of test block period indicator 28. The resulting number, preferably truncated, will give the number of test blocks that BIOS 22 can test during the idle period. Next, in order to determine the total memory tested during this idle period, the number of periods will be multiplied by the test block size indicator 26.

At step 64, BIOS 22 will then read test pointer 24 to determine the next memory block to test. This information will direct BIOS 22 to the next portion of memory that should be tested.

In step 66 the selected number of memory test blocks are tested. Here BIOS 22 performs data and address testing on the memory test blocks.

Once BIOS 22 is finished testing the memory test blocks, BIOS 22 resets test pointer 24 to indicate the next portion of memory that will be tested.

In step 70, BIOS 22 continues its boot operation until the next idle period is identified. If another idle period is encountered the process repeats the steps beginning at step 56. If the boot is complete, the method continues to step 72 where the boot operation ends.

At step 58, it may not be possible to determine the length of the idle period. In this situation, the method proceeds to step 74 where BIOS 22 reads test pointer 24. Test pointer 24 tells BIOS 22 where the next portion of memory to test is located.

At step 76, BIOS 22 reads test block size indicator 26. BIOS 22 then tests a test memory block. Next BIOS 22 resets test pointer 24 to indicate the next portion of memory that needs to be tested.

Next, BIOS 22 determines if the idle period has ended in step 80. BIOS 22 may do this by communicating with the device or component on which it is waiting. If the device is not ready, the method loops back to step 74. In one embodiment, BIOS 22 tests a first test block during an idle period, then if BIOS 22 determines that the idle period has not ended, BIOS 22 tests a second test block. In alternative embodiments, this process may repeat multiple times before BIOS 22 determines that the idle period is complete.

If at step 80, BIOS 22 determines that the device is ready, BIOS 22 will determine that the idle period is complete and the method continues to step 70.

At step 70 the boot will continue with its next operation. If another idle period is encountered, the method will start again at step 56. If the boot operation is complete the process will end at step 72.

FIG. 3 is a schematic flow diagram showing representative steps included in a boot operation for information handling system 10. A boot operation typically includes a power-on self-test (POST) routine and the loading of the operating system.

A boot or cold boot for the purpose of this disclosure means any boot in which BIOS 22 initiates a POST routine. For instance, a cold boot occurs when a user physically switches on a computer. Additionally, any boot from a so-called S5 state is considered a boot/cold boot for the purposes of this disclosure.

The boot operation begins at step 100. The boot starts when a signal follows a path to the CPU and invokes BIOS 22. The signal may also clear any data left on memory 14. The signal resets the CPU register, or program counter to a specific number. In many cases, the hexadecimal number of the CPU register will be F000. F000 represents the first portion of the RAM 14 used by information handling system 10 and is often the first megabyte of memory 14.

In step 102, the CPU copies BIOS 22 from its ROM chip 20 to the address F000 on the RAM portion of memory 14. Here BIOS 22 is run from RAM instead of ROM, which speeds the POST routine.

In step 102, BIOS 22 reads the idle period stored in test block period indicator 28 and then calibrates the size of the memory test block for the selected set idle period. BIOS 22 stores the size block in test block size indicator 26. After this step is complete BIOS 22 initiates the POST routine.

Next, step 104 tests a relatively small amount of memory, sufficient to allow the video controllers associated with system 10 to operate. The amount of memory may be the first or second megabyte of memory 14. In another embodiment, the POST routine tests the memory contained on a display adapter. Once BIOS 22 tests the relatively small amount of memory necessary for video, it will reset test pointer 24 to indicate the next portion of memory 14 to test.

Step 106 initiates the video. The POST routine configures the video by testing the video signals that control the display. Following this step, the video is ready and can be used to send visual displays to monitor 30.

During step 106, an idle period may occur when BIOS 22 must wait for display 30 to be ready. If an idle period occurs, BIOS 22 will perform step 108 until the idle period is over.

In step 108, BIOS 22 tests memory blocks during the idle period, as described in FIG. 2. Once the idle period is complete, BIOS 22 returns to step 106 and finishes initiating the video.

In step 110, the POST routine then executes the peripheral component interconnect (PCI) configuration. The configuration assesses the status all of the peripheral attachments on information handling system 10. This step also checks all of the cards that have been plugged in. Here BIOS 22 awakens the PCI devices such as PCI cards. When awakening these components, BIOS 22 must often wait for the component to propagate its awaken command. If BIOS 22 detects a period where it must wait, an idle period, then the BIOS will perform step 112.

During step 112, BIOS 22 will perform memory testing for the duration of the idle period as it did in step 108. Because there may be multiple PCI devices in information handling system 10, BIOS 22 may switch in between steps 110 and 112 multiple times before BIOS 22 is finished configuring all the PCI components.

Next, the hard drive is initialized in step 114. As a mechanical device, the hard drive takes time to physically rotate to a particular portion of the platter. During this spin up time, BIOS 22 is idle.

During this idle time, BIOS 22 moves to step 116, and tests blocks of memory while waiting for the hard drive to initialize. Once the idle period is complete, BIOS 22 will move back to step 116 and determine whether spin-up is complete. If spin-up is not complete, BIOS 22 will repeat step 116. This cycle will continue until the hard drive spin-up is complete.

In step 118, the POST routine enumerates the universal serial bus (USB) devices. Here the POST routine checks the mouse, keyboard, and other USB devices. While making sure that these devices all function properly, BIOS 22 must wait for these systems to set up and respond. During these waiting periods, BIOS 22 performs step 120.

In step 120, BIOS 22 tests blocks of memory while waiting for the idle period to end. After the idle period ends, the POST routine moves back to step 118. If the idle period has not ended, additional blocks of memory are tested. After a block of memory has been tested, BIOS 22 will reset test pointer 24 to indicate the next portion of memory to test. Once step 118 is finished, the POST routine moves to step 122.

Although the represented embodiment only shows four possible steps where idle periods occur; alternative embodiments may include additional idle periods where BIOS 22 may perform test memory blocks. In one alternative embodiment, BIOS 22 tests at least one memory block during at least one idle period for initiating an associated CD ROM drive. In another embodiment, at least one idle period occurs during the initialization period for a storage drive.

The POST routine then tests the rest of the memory 14 in step 122. BIOS 22 reads test pointer 24 to determine the first portion of untested memory. By having tested previous blocks of memory during previous idle periods in steps 108, 112, 114, and 116, step 122 decreases in time because less of memory 14 needs to be tested. Therefore total POST time and boot time would significantly decrease in time. This disclosure has the advantage of decreasing boot time by speeding up the testing of memory 14 by having tested memory blocks during earlier idle parts of the boot.

Testing blocks of memory 14 during idle periods is a strategic use of information handling system 10's memory testing resources. Instead of having BIOS 22 wait idly during periods of the boot, BIOS 22 performs memory testing. The system maintains a high level of integrity because memory 14 is tested as it normally would be tested, except it is tested in smaller blocks during idle times. By testing the memory in smaller segments during idle periods of the POST routine, the boot time decreases without a decrease in system performance.

Finally, in step 124, the POST routine ends and hands off to the operating system. The operating system allows the hardware to connect and interact with the software. Once the operating system is finished, the boot ends in step 126.

Although the disclosed embodiments have been described in detail, it should be understood that various changes, substitutions and alterations can be made to the embodiments without departing from their spirit and scope.

What is claimed is:

1. An information handing system comprising:
a processor;
a Random Access Memory (RAM) in communication with the processor;
a Basic Input/Output System (BIOS) in communication with the processor, the BIOS having a memory test pointer and a test block size indicator;

the BIOS operable to perform a Power On Self Test (POST) routine and further operable to test at least one test block of the RAM during at least one idle period during the POST routine.

2. The information handing system of claim 1 further comprising the test pointer operable to indicate the portion of the RAM to be tested.

3. The information handling system of claim 1 further comprising a test block period indicator.

4. The information handling system of claim 3 further comprising the test block period set at approximately one hundred microseconds (100 us).

5. The information handing system of claim 3 further comprising the test block period set between the range of 50 microseconds and 250 microseconds.

6. The information handling system of claim 1 wherein at least one idle period comprises a spin-up period for an associated hard drive.

7. The information handling system of claim 1 wherein at least one idle period comprises an initialization period for an association Universal Serial Bus (USB) device.

8. The information handling system of claim 1 wherein at least one idle period comprises an initialization period for an associated optical drive.

9. The information handling system of claim 1 wherein at least one idle period comprises an initialization period for an associated storage drive.

10. The information handling system of claim 1 wherein the BIOS further comprises a test block period and the BIOS further operable to calibrate the test block size indicator based upon the test block period.

11. The information handling system of claim 1 further comprising the BIOS operable to:
   test a plurality of test blocks of the RAM during a first idle period; and
   test a plurality of test blocks of the RAM during a second idle period.

12. The information handling system of claim 1 further comprising the BIOS operable to:
   test a first test block during an idle period;
   determine whether the idle period has ended; and
   test a second test block if the BIOS determines that the idle period has not ended.

13. A basic input output system (BIOS) comprising:
   a test pointer;
   a memory test block size indicator having a pre-selected period;
   a memory test block period indicator;
   the BIOS operable to calibrate the test block size indicator for the pre-selected period prior to running a Power On Self Test (POST) routine; and
   the BIOS further operable to test at least one memory test block during at least one idle period during the POST routine.

14. The BIOS of claim 13 further comprising the pre-selected period set between the range of 50 microseconds and 250 microseconds.

15. The BIOS of claim 13 further comprising the memory test block size indicator showing the amount of memory to be tested in each memory test block.

16. The BIOS of claim 13 wherein the idle period comprises a spin-up period of an associated hard drive.

17. The BIOS of claim 13 wherein the idle period comprises an initialization period for an associated Universal Serial Bus device.

18. A method for reducing Power On Self Test (POST) routine times for an information handling system comprising:
   providing a basic input/output system (BIOS) having a test pointer, a test block size indicator, and a test block period indicator;
   calibrating the test block size indicator prior to a POST routine; and
   testing at least one test block during at least one idle period during the POST routine.

19. The method of claim 18 further comprising testing at least one memory block during a hard drive spin-up period during the POST routine.

20. The method of claim 18 further comprising testing at least one memory block during an initialization period for an associated component during the POST routine.

* * * * *